(12) United States Patent
Simeonov et al.

(10) Patent No.: US 11,210,823 B1
(45) Date of Patent: Dec. 28, 2021

(54) SYSTEMS AND METHODS FOR ATTRIBUTING VALUE TO DATA ANALYTICS-DRIVEN SYSTEM COMPONENTS

(71) Applicant: Swoop Inc., Cambridge, MA (US)

(72) Inventors: Simeon Simeonov, Lincoln, MA (US); Edward Zahrebelski, Hoffman Estates, IL (US)

(73) Assignee: Swoop Inc., Cambridge, MA (US)

( * ) Notice: Subject to any disclaimer, the term of this patent is extended or adjusted under 35 U.S.C. 154(b) by 0 days.

(21) Appl. No.: 16/585,106

(22) Filed: Sep. 27, 2019

Related U.S. Application Data

(63) Continuation of application No. 16/431,143, filed on Jun. 4, 2019, now abandoned.

(60) Provisional application No. 62/680,261, filed on Jun. 4, 2018.

(51) Int. Cl.
*G06N 20/00* (2019.01)
*G06T 11/20* (2006.01)

(52) U.S. Cl.
CPC ............ *G06T 11/206* (2013.01); *G06N 20/00* (2019.01)

(58) Field of Classification Search
CPC .............................. G06T 11/206; G06N 20/00
See application file for complete search history.

(56) References Cited

U.S. PATENT DOCUMENTS

| | | | |
|---|---|---|---|
| 2011/0119530 A1* | 5/2011 | Lazzaro | G06N 5/02 714/39 |
| 2014/0282180 A1 | 9/2014 | Orofino | |
| 2018/0152361 A1* | 5/2018 | Chu | H04L 12/44 |
| 2018/0157577 A1* | 6/2018 | Della Corte | G06F 11/3612 |
| 2018/0203673 A1* | 7/2018 | Ravishankar | G06F 9/50 |
| 2019/0154872 A1 | 5/2019 | Leduc | |

OTHER PUBLICATIONS

U.S. Appl. No. 16/431,143, Systems and Methods for Attributing Value to Data Analytics-Driven System Components, filed Jun. 4, 2019.

* cited by examiner

*Primary Examiner* — Jitesh Patel
(74) *Attorney, Agent, or Firm* — Goodwin Procter LLP

(57) ABSTRACT

Values are attributed to components of a data analytics-driven system by representing the system as a computational graph. The computational graph embodies a function that takes one or more inputs and produces an output, and each component of the system is represented as a subgraph of the computational graph. A usage metric is calculated for each component of the system by determining whether the output of the function of the system is affected by the component. A utility metric is also calculated for each component of the system. Based on the calculated component usage metrics and utility metrics, respective value are allocated to the system components.

20 Claims, 4 Drawing Sheets

SYSTEMS AND METHODS FOR ATTRIBUTING VALUE TO DATA ANALYTICS-DRIVEN SYSTEM COMPONENTS

CROSS-REFERENCE TO RELATED APPLICATION

This application is a continuation of U.S. patent application Ser. No. 16/431,143, filed on Jun. 4, 2019, which claims priority to and the benefit of U.S. Provisional Patent Application No. 62/680,261, filed on Jun. 4, 2018, the entirety of which is incorporated by reference herein.

FIELD OF THE INVENTION

This disclosure relates generally to systems that use informational inputs to create value and, more specifically, to systems that rely on data analytics, machine learning and optimization methods to achieve outputs based on the inputs.

BACKGROUND

In a world increasingly shaped by data analytics (data science (DS), machine learning (ML) and artificial intelligence (AI), etc.) techniques that are readily available, the value and competitive differentiation often stem from the data that is available for processing and the models that process that data. There is a growing ecosystem providing data, models and tools for licensing/purchase, such as:
Data, e.g., audience segment data for digital advertising provided by data management platforms (DMPs).
Metadata enhancement APIs for various assets such as:
  Devices: identity resolution, device fingerprinting, fraud scoring
  URLs: classification into categories, summarization, sentiment analysis, . . .
  Images: classification, auto-tagging, entity identification
  Locations: business information, audience characteristics
ML/AI data prep, model training and validation services such as the ones provided by major cloud vendors.
ML/AI transformers/models, e.g., in the domain of visual quality assurance, a pre-trained deep neural network (DNN) that addresses a particular defect (e.g., cracking, out of tolerance measurements, etc.).
Constrained optimization and other types of tooling, e.g., the Gurobi product line.

In conventional approaches, sellers provide the above components organized in packages to buyers via aggregators. Buyers implement data analytics-powered systems that incorporate the purchased components. Such systems may execute across multiple buyers as well as other entities, as necessary. Currently, buyers and sellers/aggregators typically negotiate business arrangements in isolation.

When deciding whether to use a particular component or package, a buyer has to determine whether the marginal value of adding/removing the component outweighs the marginal cost. In many business scenarios, value can only be determined after (in some cases, long after) system outputs have been observed. However, the cost of the components or packages is rarely driven by the business value created. Instead, it is typically based, over a period of time, on one or more of:

System usage, such as a per unit of some system operation or system configuration (e.g., named business user, server/core, API call, system request, real-time bidding (RTB) auction win, advertisement delivery or display, identity, unit sold, play), etc.;
Component usage, e.g., the number of times a component is attributed to have taken part in generating system output;
A capacity measure, such as maximum bandwidth, maximum simultaneous operations/requests, maximum concurrency, etc.; and/or
A common business metric, such as revenue/profit net of certain deductions.

These measures are typically used to define the economics of the relationship between buyers and sellers/aggregators of components/packages in the expectation of value creation. Such an approach makes sense in systems where the relationship between inputs and outputs is well-defined and easy to predict and when the relationship between system output and business value is straightforward. However, this is rarely the case in data analytics systems, especially ones involving ML/AI models and/or constrained optimization. It is also not the case where the environment that the systems operate in is evolving, i.e., where the results of any tests performed to set value expectations and negotiate economics may be invalidated over time as the ML/AI models change or new inputs are identified or exogenous factors such as user preferences change. The environment in which the invention may operate and present results to be measured may be external to the system, e.g., the way viewers respond to advertisements presented on a web page or within a mobile application. In other cases, the measurement may be internal to the system, e.g., the state of the system itself.

For example, a targeted display advertising system may use two components, A and B, from two sellers each representing an audience segment for "maleness". Assuming knowledge of maleness is important to the system, there is utility in understanding the resultant, variable value of implementing the following changes to the system (at an atomic level) before the changes are implemented (involving, for example, training, tuning & deploying new models using some combination of A and B):

1. A becomes available, where neither A nor B were available.
2. B becomes available, where neither A nor B were available.
3. B becomes available after the system is already running with A available.
4. A becomes available after the system is already running with B available.

Assuming that audience segments A and B are not completely independent yet also not identical, under common scenarios, 0—the marginal value A adds in (3) is lower than in (1). The same is true for B and, furthermore, when both A and B are present, while the combined value is likely higher (because the signals are not identical), the individual "worth" of each signal as part of the union is lower (because the signals are not independent). Stated mathematically, if $V(x)$ denotes the value of a case (1-4), $V(1)+V(2)>V(3 \text{ or } 4)$. Hence, any pricing arrangement where calculating the cost of A is independent of the use of B cannot hope to correctly align the cost of A with the value of A.

Determining the economic benefit of a component/package without directly measuring business value, or independently of other components, a buyer assumes the risk that the marginal benefit of the component may be negative. This uncertainty leads to suboptimal resource allocation. Today, buyers bear most if not all of the risk of purchasing components and packages for data analytics systems. This uncertainty reduces buyer demand and dampens the growth of the entire ecosystem. If the risk associated with component performance (e.g., marginal benefit) were shared between the buyers and the sellers/aggregators, i.e., if the economics received by a seller related to the value of the components they provided and/or the performance of other sellers' components, overall buyer demand would increase.

BRIEF SUMMARY

In one aspect, a computer-implemented method for attributing value to components of a system includes the steps of: representing a data analytics-driven system having a plurality of components as a computational graph, the computational graph comprising a function that takes one or more inputs and produces an output, wherein each component of the system comprises a subgraph of the computational graph; calculating a usage metric for each component of the system by determining whether the output of the function of the system is affected by the component; calculating a utility metric for each component of the system; and based on the usage metric and the utility metric calculated for each component of the system, allocating a respective value to one or more of the components of the system. Other aspects of the foregoing include corresponding systems and computer-executable instructions stored on non-transitory storage media.

In one implementation, calculating the usage metric for a first component of the system comprising a first subgraph of the computational graph includes: transforming the first subgraph such that each other subgraph connected to the first subgraph is a single node; calculating a usage value for each node in the transformed first subgraph; and calculating the usage metric based on the usage values. In another implementation, calculating the utility metric for a first component of the system includes: if a utility function exists for the component, using the utility function to calculate the utility metric for the first component; and if a utility function does not exist for the component, assigning a placeholder utility to the first component.

In a further implementation, the usage metric and the utility metric calculated for each component of the system are combined to form combined metric data. The foregoing combining can include associating a particular usage metric and a particular utility metric at a same level of granularity. The allocation of a respective value to a first component of the system comprising a first subgraph of the computational graph can then include applying a node-specific value decomposition algorithm to the first subgraph. In another implementation, allocating a respective value to one or more of the components of the system includes: providing the usage metric and the utility metric calculated for each component as input to a machine learning algorithm; and receiving as output from the machine learning algorithm a value for each component according to an expected marginal utility of the component. Values calculated for the components of the system can also be aggregated at a package level.

In one implementation, a particular subgraph of the computation graph includes nodes representing data sources and/or machine learning processes. The computational graph can include a directed acyclic graph.

The details of one or more implementations of the subject matter described in the present specification are set forth in the accompanying drawings and the description below.

Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DESCRIPTION OF THE INVENTION

Aspects of the invention provide techniques, an operational framework and supporting systems that determine value for components and aggregate value for those components within their respective packages according to any predefined set of allocation rules agreed upon by buyers and sellers. Based on this approach, buyers and sellers are not only able to assess the values of the components independently, but also in a manner whereby the value is dependent upon other components used in the system.

The Buyer/Seller/Aggregator concepts are simply labels placed on roles of those operating in an ecosystem. In some cases, there may be no aggregator: a buyer may work with multiple sellers directly. Also, the terms "pricing" and "purchasing" as used herein may be generalized to concepts such as "valuing" and "using" where there is no financial exchange, such as in an enterprise attributing value to internally-developed components and determining whether to continue investing in them. In such a case, the seller is essentially "provider" of components and the buyer a "consumer."

Data analytics-powered systems can be represented as functions because they achieve outputs based on one or more informational inputs. For example, in a system for displaying targeted advertising, the input may be a programmatic bid request using an open real time bidding protocol and the output is a decision whether or not to submit a bid and, in some cases, parameters of the bid. In the case of a system for visual quality assurance in a manufacturing setting, the input may be images from multiple cameras and the output may be 0 (no further action required) or 1 (human inspection required).

Figure 1:
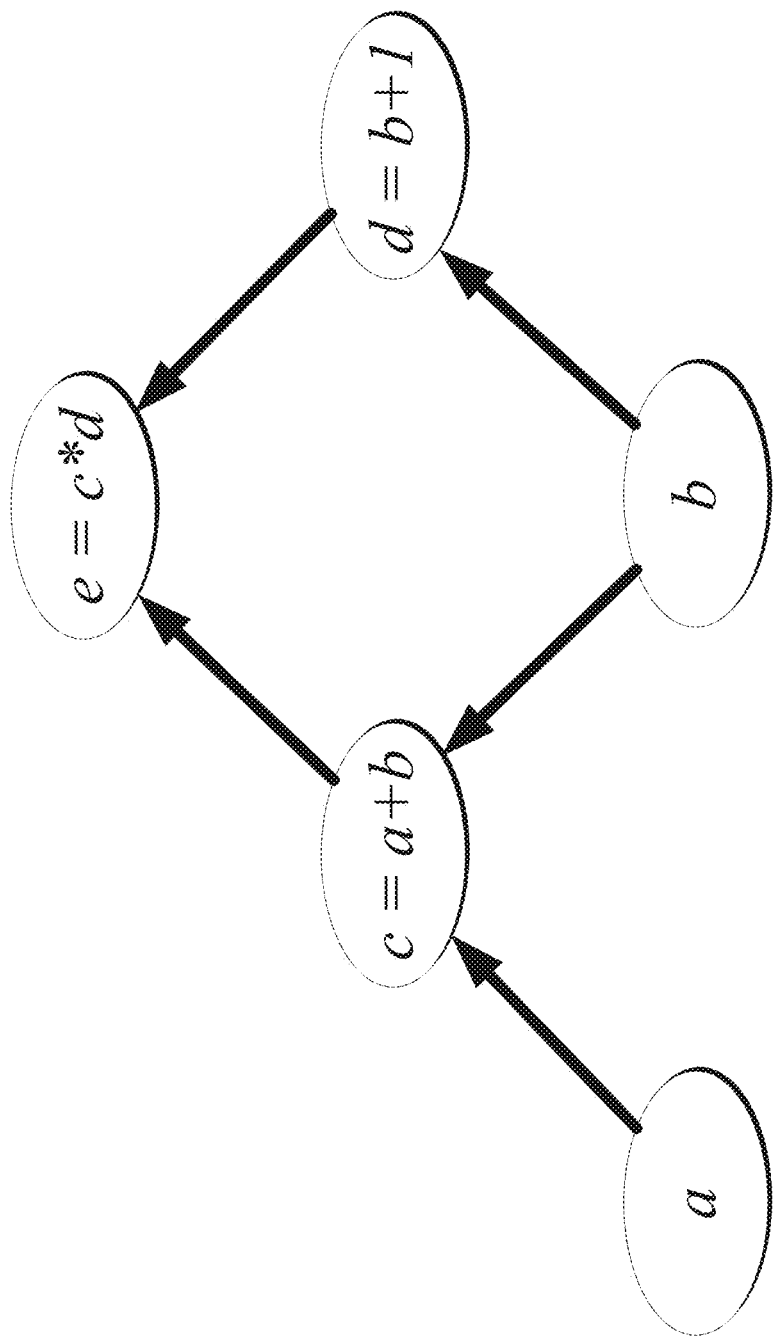
FIG. 1 depicts an example of a directed acyclic graph computing a function.

Function internals can be represented as computation graphs—directed acyclic graphs, DAGs—at various levels of abstraction without loss of generality. An example of a graph computing $(a+b)*(b+1)$ is shown below in FIG. 1. Using a computational graph representation, a Component is a subgraph.

Computation graph nodes may represent computation at arbitrary granularity and include arbitrary metadata as well as be associated with supporting logic for implementing embodiments of this invention. Edges may be similarly associated with metadata and supporting logic.

Figure 2:
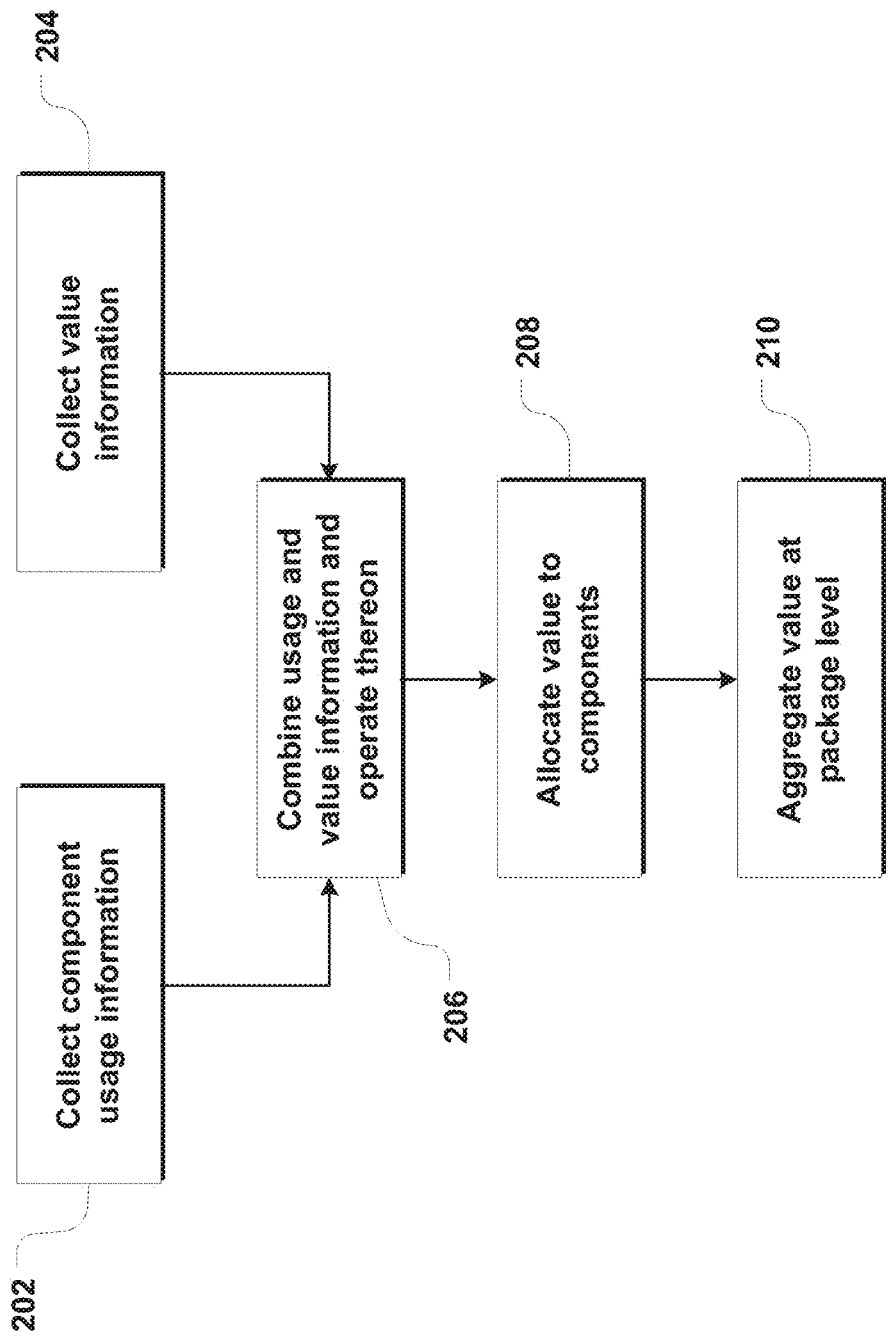
FIG. 2 depicts a method of allocating value to system components according to an implementation.

When considering one buyer using components from multiple sellers and, without loss of generality, assuming that economic relationships are defined at the package level, the problem of determining payment to sellers may be broken into the following steps, as depicted in FIG. 2:

1. Collecting component usage information (in addition to any other system-related data) (Step 202).
2. Collecting information related to value (Step 204).
3. Combining (1) and (2) to allow algorithms to operate on the information (Step 206).
4. Allocating value to components (Step 208).
5. Aggregating value at the package level (Step 210).
6. Determining buyer & seller economics (if necessary).
7. Facilitate optimization of component/package usage and seller economics and any desired re-negotiation.

Without loss of generality the following assumptions can be made:

The solution is for a single payment period t.

All sellers are on the same payment schedule, as any differences in payment schedules may be addressed by, for example, solving at the most granular level and aggregation.

The process is performed by a new role (Attributor) that has access to all necessary data and logic, though in embodiments multiple entities and systems may be involved.

Any mention of data applies equally well to datasets in any format as well as functions/APIs that produce the data as outputs, given appropriate inputs.

Component usage information (usage metrics) encompasses the data needed to allocate value to components and determine an economic (or some other) relationship between buyer and seller. This information is generated by one or more sources, one of which may be the buyer. The data may be collected at different levels of granularity where the least granular level is the payment period. A level of granularity is defined by implicit or explicit dimension data associated with usage metrics, e.g., date, various IDs, etc.

Usage metrics may have different meaning (units, formats, etc.) at different levels of granularity and from different sources. When changing the level of granularity, not all usage metrics need aggregation with the addition (+) operator. In embodiments of the invention a single component may have multiple usage metrics at the most granular level. Even if there is a single usage metric at the most granular level, there may be multiple metrics at higher levels of granularity built using multiple aggregation operators. In practice, these tend to be both associative and commutative. Common examples include addition (+), min, max and set union. Set union, in particular, allows information from finer levels of granularity to be preserved.

Usage metrics may be collected not just for components from sellers but for any subgraph of the system's computational graph. As a result, usage metrics may be collected for subgraphs of subgraphs for which usage metrics are collected. In one particular embodiment, usage metrics are collected at both the component and the package level.

Measuring component usage may require some understanding of how a system operates using, for example, its computation graph. There are many established mechanisms for representing ML/AI models and/or processing pipelines that may serve as a partial or complete representation of a computation graph, e.g., TensorFlow, MLeap, Open Neural Network Exchange (ONNX), Predictive Model Markup Language (PMML), Portable Format for Analytics (PFA), etc. The actual representation used in embodiments may be a substantially transformed version of the above with additional information added as nodes, edges and/or properties thereof. Some embodiments may use entirely different system representations. In other embodiments the generation of some usage metrics may be partially or completely expressed in code specific to those metrics as opposed to being driven by algorithms operating on some system representation.

In one embodiment, a component usage metric may be thought of as a real-valued function taking as its input system inputs at a particular level of granularity and returning:

0 when system outputs were not affected by the component a positive value otherwise. Common sub-variants include:

Returning 1 if any system output was affected by the component

Returning the count of system outputs that were affected by the component, where the unit of counting is typically the lowest level of granularity and where, regardless of the level of granularity of counting, it is common to include the total count of system outputs.

A variation of the above where, per unit of system output, a component's usage may increase by any positive number.

A variation of the above two where, instead of total count, usage metrics are relative, e.g., counts are divided by the total count.

In some embodiments, it may be useful to compute usage metrics based on component presence. Presence is specific to component types at a chosen level of granularity. For example, a data component may be deemed present if it has at least one non-null (or, perhaps non-false) value in system inputs. Alternatively, a model component may be deemed present if its function is evaluated to produce system output.

Some embodiments may use the following algorithm to compute usage for a single component from presence at the lowest level of granularity:

componentUsage(component):
    Transform computation graph such that each connected subgraph of component is a single node
    Add a new stopNode and connect all nodes without successors to it defaultUsage(component, stopNode)
edgeUsage(component, edge):
    node=edge.from
    if node.belongsTo(component)
    if component.isPresent 1.0
    else 0.0
    else if existsPath(component, node)
    usageCalculator(node.type).edgeUsage(component, edge)
    else 0.0
existsPath(component, node):
    returns true if there exists a path from any node in component to node
defaultUsage(component, node):
    node.predecessorEdges.map {predEdge=>
    edgeUsage(component, predEdge)
    }.sum
usageCalculator(nodeType):
    returns a node-specific usage calculator The above technique executes within the context of a specific set of system inputs and relies on node-type-specific usage calculators in order to handle all possible node types in a computation graph. Embodiments may include the following usage calculator edgeUsage(component, edge) implementations for frequently-encountered node types:

A branching node, e.g., if-then-else or case-when-else, returns defaultUsage(component, edge.from) for the active branch and 0 otherwise.

A combiner node, often used in model ensembles, that combines using an arithmetic weighted average with weights $w_1 \ldots w_n$, will combine the predecessor node usage using the same weights.

For classification and regression models, the output is 0 if changes in component-related inputs have no effect on outputs, e.g., if the linear regression coefficients associated with component-related inputs are all 0, and defaultUsage(component, edge.from) otherwise. In an implementation variation the usage output may vary based on how component-related inputs affect model output relative to other inputs. In the case of linear regression, output may be based on coefficient magnitude, confidence, etc.

When embodiments encounter unknown node types, they may choose to use a "default" usage calculator. It is common for edgeUsage(component, edge) to return default Usage (component, edge from). The default usage calculation works especially well for many nodes that have a single predecessor and a single successor, e.g., one hot encoders, tokenizers, stop word removers, n-gram generators, most binarizers, string indexers, scalers, normalizers, bucketizers, discretizers, etc. In the case where unknown inputs generate "undefined" outputs, the implementation should return 0 in the case of unknown inputs. For example, in the case of a one hot encoder, if the output vector has 0s everywhere, the usage is 0.

Embodiments may use variations of this algorithm that allow usage metrics for all components to be computed together, in a single traversal of the computation graph. Any usage calculation algorithm that stakeholders (buyers, sellers, etc.) agree to may be used.

Value is used here in the manner similar to how utility is used in economics and, therefore the two terms may be used interchangeably and measured in terms of units of utility, or "utils" and, just as the utils of two individuals may not have compatible units, so the utils associated with different usage metrics and/or different levels of granularity do not have to be compatible. This does not affect processing as they may be converted and/or aggregated across incompatible units as needed. Utils may also be negative. While utility may be calculated via a utility function, any metric may be used for utility, such as revenue, profit, operating margin or, in the domain of online advertising, ad impressions, etc.

Utility is frequently a multi-objective function. In constrained optimization domains, meeting or failing constraints affects value just as the core minimization/maximization objective does. The utility function may be revealed directly or may be implicitly observed via allocation choices. If there is no utility function we can substitute a constant "placeholder" utility of 1.0 at the least granular level (the payment period).

Because utility functions tend to be non-linear, multiple points on the utility curves cannot be easily combined via operators such as vector addition (assuming vectors start at the origin). Therefore, when collecting information related to value, embodiments may prefer to collect aggregable metrics instead of or in addition to utility.

Figure 3:
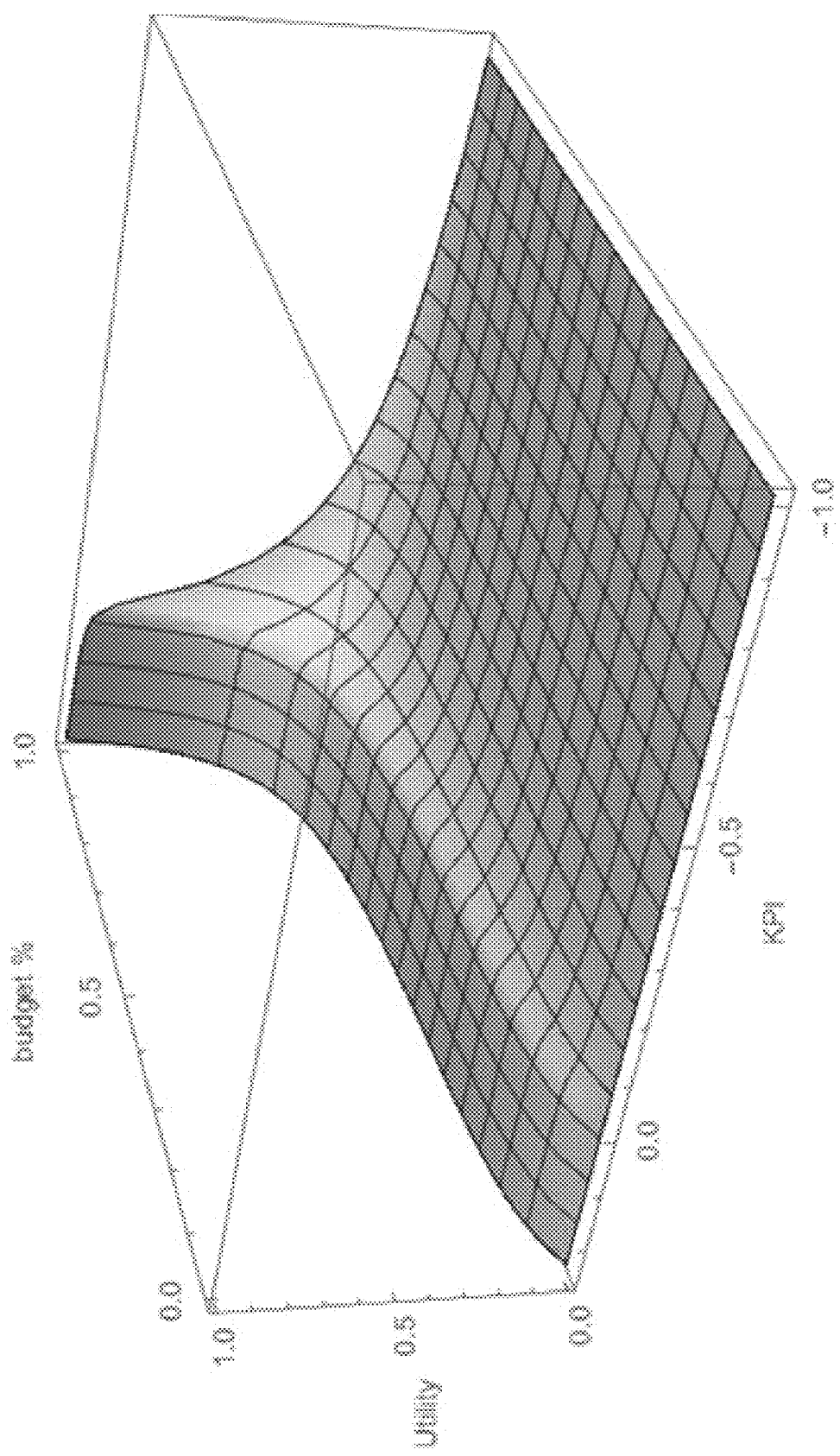
FIG. 3 depicts an example utility function for a campaign.

For example, in the domain of online advertising, a simple utility function at the campaign level may have two objectives: (a) spend the advertiser's budget and (b) meet or exceed the campaign's key performance indicator (KPI). Across all campaigns and KPIs, the axes of utility may be defined as budget spent (0-100%) and difference from KPI, such that—100% means no progress on the KPI, 0% means KPI met and higher values meaning KPI exceeded. An example utility function for a campaign may look like FIG. 3.

While percent of budget spent is a value that may be aggregated, embodiments may choose to collect precursor metrics such as (amount_spent, total_budget) or (amount_spent, campaign_id), assuming total_budget may be resolved by campaign_id at a later point via an API call, join, etc.

Percent difference from KPI is not a value that may be aggregated, thus embodiments may collect precursor metrics, which will vary based on the type of KPI, e.g.:

Unique user reach (UR) requires calculating distinct counts based on some user ID(s). Since distinct counts do not aggregate, in some embodiments raw data is maintained (or implement metrics as APIs that run the equivalent of queries to produce the answer). Alternatively, some embodiments may choose to use probabilistic data structures such as HyperLogLog (HLL) sketches, which can then be aggregated.

Audience quality (AQ) requires multiple distinct counts, e.g., a total count and a target audience count so that a ratio may be computed when necessary. Such embodiments may use the techniques described above.

Click-through rate (CTR) requires counts of ad impressions and clicks.

Cost per action (CPA) requires the cost the advertiser will be charged and the number of actions. This applies to any cost-per-X KPI as well as the logical inverse: X-per-unit-of-spending.

Not all value metrics may be available at the unit of granularity of usage metrics or even for the same time window. Continuing with the advertising example, advertisers are typically charged once per month and they may not be charged the exact media cost for any number of reasons ranging from goodwill over-delivery to conflicting measures. In such cases, an estimate may be used. The process of value attribution and determining buyer and seller economics may be run with estimates first and later re-run with actuals with appropriate action taken if there are (material) differences.

In order to perform computations on the interaction between usage (metrics) and value (metrics), embodiments of the invention consider both types of metrics at the same level of granularity. Typically, this involves some aggregation and/or joining different datasets, especially in the case where value metrics are not available at the time or place usage metrics are collected. This may require additional dimensions to be added to collected data for the purpose of enabling the linkage between usage and value metrics. For example, in the domain of programmatic advertising, audience segment usage data may be collected by demand side platforms (DSPs) as part of responding to bid requests. Click information and post-click user engagement data are may not be available to DSPs. To associate them with audience segment usage embodiments may use ad IDs, request IDs, campaign IDs, etc. Processing at the same level of granularity does not have to happen across all Components at the same time. Processing at the same level of granularity can happen across disjoint subsets of components and/or other subsets of dimension values, provided there is a way to combine the attributed value.

Such embodiments may allocate value to components using one of two methods or a combination thereof:

1. White box approach, based primarily on system analysis

2. Black box approach, based primarily on statistical and ML/AI techniques

The white box approach requires, at some level of granularity, usage metrics to be associated with a value metric. Each "row" of usage metrics can be associated with a value column. The technique then adds more value columns, one per component, such that the sum of the values in component value columns is less than or equal to value.

One embodiment where the value metric is a real function in linear space may use the following value decomposition algorithm:

componentValues(components, totalValue):
    values=components.map {component=>
    valueOf(component, totalValue)
    }
    allComponents=component, which is the union of all component subgraphs
    nonComponentValue=totalValue−valueOf(allComponents, totalValue)
    values.map {value=>
    totalValue*value/(values.sum+nonComponentValue)
    }
valueOf(component, totalValue):
    Transform computation graph such that each connected subgraph of component is a single node
    Add a new stopNode and connect all nodes without successors to it
    componentValue=0
    processNode(component, node, value):
        nodeValue, predecessorValues=decomposer(node.type).decompose(component, node, value)
        if node.belongsTo(component) componentValue+=nodeValue
        predecessorValues.foreach {(predecessor, predecessorValue)=>processNode(component, predecessor, predecessorValue)
        }
    processNode(component, stopNode, totalValue)
    componentValue
decomposer(nodeType):
    returns a node-specific value decomposer The componentValues function returns a sequence of values mapping, in order, to components. A measure of value is calculated per component and for all components together. The latter is used to create a measure for value attributed to non-component nodes in the computation graph, the difference between totalValue and the value of all components. All thus calculated values are scaled to ensure that the sum of component values plus non-component value equates to totalValue.

The algorithm uses node-specific value decomposition, similar to the usage metrics in the presence algorithm. While decomposers may use any business rules and/or other mechanisms to perform their work, various embodiments may take advantage of the following approaches:

- The decomposer for a node with no predecessors attributes all value to the node.
- Decomposers may look to predecessors and successors to identify patterns in value decomposition that may be handled together. For example, in the domain of digital advertising, audience segment data is keyed off of some type of identity, which will be an input to the node providing the data. This pattern may be detected and a rule applied to split the value between the data itself and the role identity linkage plays to make the data available.

Without any higher-priority rule interceding, e.g., the example above, nodes representing data inputs attribute all value to themselves when they are part of the component being evaluated and no value when another component is being evaluated. In the audience segment example from the previous bullet, the identity service will be attributed some value from its own evaluation even though it will be attributed no value when the data components it enables are evaluated.

- A branching node, e.g., if-then-else or case-when-else, distributes value according to the share of branches taken.
- A combiner node, often used in model ensembles, that combines using an arithmetic weighted average with weights $w_1 \ldots w_n$, will decompose value using the same weights.
- For classification and regression models, a simple decomposition splits equally to all input nodes that have a chance of affecting node output. For example, for linear regression it may be nodes providing inputs with non-zero coefficients. As before, an implementation variation may use additional model properties for finer control of value decomposition.
- The default decomposer for an unknown node type attributes no value to the node.

The above rules may be applied in priority order based on pattern-matching in the computation graph. When the value metric is not in linear space but, for example, in log space, the algorithm can be adjusted accordingly.

Black box approaches operate primarily on collected data (dimensions, usage/value metrics, etc.). Some embodiments can benefit from information about the data analytics system, including but not limited to representations related to its computation graph, but do not require it.

Described below are embodiments of the black box approach that illustrate how value is determined using a general framework. Usage and value metrics (implicit or explicit) for components are the minimum data needed for the black box method to produce results. However, that data can be enhanced with additional dimensions like execution environments, packages and other sets of components, "black box" modules in which, for example, AI/ML, algorithms function on data, utilities (e.g., normalization, filtering, etc.) as well as totaling functions T(U) can also be present and help improve the efficiency, precision, and accuracy of calculating the total utilities of components respect to different value metrics.

More specifically, a framework is provided that attributes values to every item according to that item's expected marginal utilities. The marginal utilities are ultimately measurable functions or compositions of measurable functions that map raw data statistics (like usage) to real-valued utilities. The expectation operator applied to those functions is taken over a measure related to the raw data statistics. Using this technique, classic feature importance and value assignment strategies fit into the framework of estimating marginal utility given a utility function and measure. Furthermore, the value in viewing this through an expectation framework exploits the properties of the expectation operator for efficiency and parallelism while maintaining rigor.

A high-level approach is used such that:
1. Data ($\vec{p}$, utility)
2. $v(i)=E[\Delta_{p_i}\text{Value}(i)]$ Where $\vec{p}$ is an array of metrics corresponding to components, Value( ) is the utility function we try to estimate and $\Delta_{p_i}$ is any operator that gives marginal change in value of that utility function with respect to a change in any metrics $p_i$. Note that $\vec{p}$ can be a multidimensional array or tensor of metrics such that multiple metrics can refer belong to any component. This situation may arise with image or other multimedia data. For example, in the three-dimensional case, when applying the high-level valuation approach, we estimate Value( ) as a function mapping data in $\mathbb{R}^{n \times k \times m}$ to value space, which can be thought of as $\mathbb{R}$.

Without loss of generality, all usage metrics can be normalized via a min-max scaling or any other procedure such that their values are always between 0 and 1. As a specific example, counts can be normalized to usage rates.

For the Real-time Bidding and ML Estimation examples below, the following expanded algorithm may be used to compute expected marginal utility:

---
Algorithm 1
---

1. Data = ($\vec{p}$, utility)
2. Estimate $s(\vec{p}) = E[\text{Value} | \vec{p}]$
3. $\dot{v}_i(\vec{p}) = \dfrac{\partial}{\partial p_i} s(\vec{p})$
4. $v_i(\vec{p}) = \int_0^{p_i} \dot{v}_i(\vec{p}) dp'_i | \bar{p}$
5. Compute $v_i(\vec{p})$

---

Where $0 \leq p_i \leq 1$ represents normalized usage of component i and $\bar{p}$ denotes the sample mean of $\vec{p}$.

Furthermore, in step 4, the integral can also be expressed as a line integral through a suitable change of variables to:

$$\int_0^1 \dot{v}_i(t\vec{p}) dt$$

The algorithm is derived from general Aumann-Shapley values which compute expected marginal utilities with respect to a uniform measure. Using Shapley values provides an intuitive and elegant solution in cooperative games with transferable utility. A cooperative setting makes sense in any scenario where a seller is willing to accept economic terms for a package from a buyer where payments are not completely independent of payments to other packages.

The Aumann-Shapley values can be restated to fit our high-level valuation paradigm via:

$$E[\Delta_{p_i}\text{Value}(i)] = \int_\Omega \Delta_{p_i}\text{Value}(i) d\mu$$

$$\int_\Omega \Delta_{p_i}\text{Value}(i) d\mu \sim \int_\Omega (\text{Value}(S+dp_i) - \text{Value}(S)) d\mu(S)$$

Which can be thought of the expectation over all ways of perturbing $p_i \in S$ by $dp_i$ where all $p_i$ are in [0, 1] since Shapley values for cooperative games are rooted in presence rates.

Next, a change of measure is applied via the change of variables S=tS' for t in [0, 1]:

$$\int_\Omega (\text{Value}(S+dp_i) - \text{Value}(S)) d\mu(S) = \int_0^1 (\text{Value}(tS'+dp_i) - \text{Value}(tS')) dt$$

$$\int_0^1 \text{Value}(tS+dp_i) - \text{Value}(tS) dt \sim \int_0^1 \partial_{tS}\text{Value}(tS) dt$$

Which is the Aumann-Shapley value definition.

Algorithm 1 is one embodiment of the black box valuation approach. It estimates a utility or value function given usage metrics and other data dimensions via AI/ML techniques. The marginal (differential) value function for each component's usage metrics is then calculated by differentiating the learned value function with respect to the component measurement vector. In step 4, integrating over each component's conditional marginal value function with respect to the distribution measurements $\vec{p}$ arrives at the cumulative marginal value functions added by all individual components. In step 5, the cumulative marginal value functions are applied to the average usage metric vector.

For step 2, predefined rules or sophisticated stochastic methods such as Monte Carlo simulation, ML, or game theoretic estimation methods are applied to learn the value function. The estimator takes the given data as input and outputs a fit model to describe value. In step 3, partial derivatives are estimated by performing exact differentiation or sampling and performing numerical differentiation. Likewise, in step 4, numerical integration (Euler method, Monte Carlo integration, Gaussian quadrature, etc.) is then applied to compute the cumulative marginal value added by that component. These may also be viewed as model functions applied to the model function learned in step 2.

In this embodiment, the order of expectation and integration is inverted in Algorithm 1, which is justified by the dominated convergence theorem when the utility function is properly chosen with respect to the data probability measure and that step 4 makes use of the law of total expectation and Fubini's theorem to recover an approximation of the full expectation.

More specifically, starting with the statistic the approach is designed to estimate:

$$E[\Delta_{p_i}\text{Value}(i)] = E[E[\Delta_{p_i}\text{Value}(i)|\vec{p}]]$$

$$E[E[\Delta_{p_i}\text{Value}(i)|\vec{p}]] = E[\Delta_{p_i}E[\text{Value}(i)|\vec{p}]]$$

$$E[\Delta_{p_i}E[\text{Value}(i)|\vec{p}]] = E[\Delta_{p_i}E[U(\vec{p})]]$$

$$E[\Delta_{p_i}E[U(\vec{p})]] = E[E[\Delta_{p_i}E[U(\vec{p})]|p_i]]$$

$$E[E[\Delta_{p_i}E[U(\vec{p})]|p_i]] = E_{\vec{p}}[\int_{p_i}\Delta_{p_i}E[U(\vec{p})] dp_i]$$

$$E_{\vec{p}}[\int_{p_i}\Delta_{p_i}E[U(\vec{p}))] dp_i] \sim \int_{p_i}\Delta_{p_i}E[U(\vec{p})] dp_i|^{E[\vec{p}]}$$

Where an approximation of the outer expectation is used in the last step.

As shown below, the above algorithm applies to data analytics systems as the algorithm's game theoretic foundations give it expressive power even in discrete settings if a suitable utility function, component measurement distribution, and change operator $\Delta_{p_i}$ are chosen. The learning and estimation algorithm used in steps 2 and 3 are data specific with several such realizations demonstrated below.

Example 1—Real Time Advertising Bidding

Let Components 1-3 be audience segments. For a given period, a DMP receives a report from a demand side platform (DSP):

| Component Usage | | | | |
|---|---|---|---|---|
| Unit | Component 1 | Component 2 | Component 3 | Impressions |
| Unit 1 | 0.25 | 0.25 | 0.75 | 100,000 |

The Unit column helps us refer to individual data rows in the writing. It may map to some dimension data associated with metrics or it may have no "materialization" in embodiments. In practice, DSPs often measure ad deliveries rather than impressions but we'll use impressions in examples as "deliveries" are a somewhat confusing term.

The usage metrics are share of impressions the component was used in. Impressions are the value metric. In this example, the disclosed framework can reproduce the current state of art component attribution between DSPs and DMPs, which, since it is based on pay-per-use, attributes value 1-to-1 to usage in impressions.

$$E[Value \mid \vec{p}] = 100{,}000 \cdot (p_1 + p_2 + p_3)$$

$$\frac{\partial}{\partial p_i} E[Value \mid \vec{p}] = 100{,}000$$

$$v_i(\bar{p}) = \int_0^{p_i} 100{,}000 \, dp'_i \, \big|^{p_i = \bar{p}} = 100{,}000 \bar{p}$$

| Component Value | | | |
|---|---|---|---|
| | Component 1 | Component 2 | Component 3 |
| Value | 25,000 | 25,000 | 75,000 |

However, assigning value based solely on component usage is often not an equitable strategy. For example, a data component with very low usage, such as "bought a house in the last 30 days", may have immense value for a particular buyer while a data component with high prevalence, such as a gender signal, may have much lower value. In cases like these, value is a function of both usage and "performance"/ "impact" given usage. Using the framework and algorithm described above with these examples, additional embodiments are described for estimating and attributing value fairly to components.

For example, data may be provided at a finer granularity such that there are more samples, such as a daily roll-up of source usage by site or a weekly roll-up over the entire network.

Example 2—ML Estimation of Component Values

| Component Usage | | | | |
|---|---|---|---|---|
| Unit | Component 1 | Component 2 | Component 3 | Value |
| Unit 1 | 0.25 | 0.25 | 0.75 | 100,000 |
| Unit 2 | 0.22 | 0.29 | 0.7 | 110,000 |
| Unit 3 | 0.15 | 0.34 | 0.88 | 130,000 |
| ... | ... | ... | ... | ... |

It is reasonable to assume that with more data, we can learn a more sophisticated value function through AI and ML techniques for mapping component prevalence to utility. We can then use that function along with the data to determine differential component values and cumulative component values. We apply Algorithm 1 in this embodiment with regularized linear regression and regularized kernel linear regression to learn the underlying value function.

In one embodiment, regularized linear regression is used as the estimator for determining total component value given prevalence rate. This instance uses L2 regularization in order to remedy potential multicollinearity in a setting where many components may strongly correlate.

For regularized linear regression, the learned component value function is a linear function of aggregate prevalence because the marginal contribution of any component remains constant.

$$E[Value \mid \vec{p}] = s(\vec{p}) = \sum_{i=1}^{n} w_i p_i + w_0$$

After estimating value by learning $s(\vec{p})$:

$$\partial / \partial p_i s(\vec{p}) = w_i$$

and $$v_i(\bar{p}) = w_i \bar{p}$$

Suppose for the data above, the weights were estimated to be: 25,000, 100,000 and 15,000 respectively and the aggregate usages were: 0.1, 0.1 and 0.2 respectively. In this case, values are assigned to components in the following way:

| Item | Component 1 | Component 2 | Component 3 |
|---|---|---|---|
| Value | 2,500 | 10,000 | 3,000 |

Not only are components rewarded for being used but also for contributing to buyer value.

Other embodiments may choose to estimate a nonlinear true value function. For example, kernel regression may be used along with regularization for the same reasons described in the previous example. Any smooth kernel will work, e.g., a polynomial kernel of order 2 is used. This fits a function of the form:

$$E[Value \mid \vec{p}] = s(\vec{p}) = \sum_{i=1}^{n} (w_{ii} p_i^2 + w_i p_i) + \sum\sum_{j<i} w_{ij} p_i p_j + w_0$$

where $$\dot{v}(p_i) = \frac{\partial}{\partial p_i} s(\bar{p}) = w_i + 2 w_{ii} \cdot p_i + \sum_{i \neq j} w_{ij} \cdot p_j$$

and $$v_i(\bar{p}) = \int_0^{p_i} \dot{v}(\bar{p}) dp'_i \bigg|^{p_i = \bar{p}} = w_i \bar{p}_i + w_{ii} \bar{p}_i^2 + \sum_{i \neq j} w_{ij} \bar{p}_i \bar{p}_j$$

One beneficial feature of this model is that it captures interactions between components and is not computationally burdensome to estimate. Considering this model within the framework of the example data and using learned weights of:

$w_1 = 20{,}000$, $w_{11} = 10{,}000$ $w_{12} = 200{,}000$
$w_2 = 10{,}000$, $w_{12} = 200{,}000$
$w_3 = 4{,}000$
$w_0 = 80{,}000$
All other $w_{ij} = 0$.

Supposing the prevalence is the same as in the previous example, value would be assigned as:

| Item | Component 1 | Component 2 | Component 3 |
|---|---|---|---|
| Value | 4,100 | 3,000 | 800 |

In some embodiments addressing a computationally constrained system, a standard feature selection algorithm such as but not limited to info-theoretic feature selection or chi-square feature selection may be employed for reducing the dimensionality of the space of components being considered. All eliminated components are assigned a value of 0 and the remaining components are evaluated via a framework such as the cumulative differential algorithm described above. This encourages parsimony and concentrates value among the top performers. Note that the feature selector performs its own version of attribution by estimating a rough expected marginal utility according to a rigid and predefined utility function defined in a specified probability measure (see variable importance embodiment below).

In some embodiments, component usage may be binary (0—not used, 1—used), e.g., in some cases of collecting usage metrics as very fine levels of granularity. This complicates applying Algorithm 1 as there may not be a smooth or continuous measurement like usage rate to use for estimation. Example data may look like:

| | | Component Usage | | |
|---|---|---|---|---|
| Unit | Component 1 | Component 2 | Component 3 | Value |
| Unit 1 | 1 | 0 | 1 | 100,000 |
| Unit 2 | 0 | 1 | 1 | 110,000 |
| Unit 3 | 0 | 0 | 0 | 130,000 |
| ... | ... | ... | ... | ... |

In this case, a regression may be applied on the data using one of the methods above by fitting a smooth model directly to the binary data provided and using the coefficients along with the aggregate prevalence to estimate expected marginal value or re-aggregating the data at rougher granularities and applying exactly the steps in Algorithm 1.

An embodiment may use an approach originating in the field of cooperative game theory by computing the discrete Shapley values of the components provided. This approach corresponds to determining the expected discrete marginal utility of each component, $component_i$, over all sets (coalitions) of components that do not contain $component_i$ before and after adding $component_i$. All combinations of components are assumed to arise with probability proportional to the number of ways that combination of components can be chosen from the set of all components.

The original Shapley Value algorithm either computes directly or approximates:

$$v_i = \frac{1}{|N|} \sum_{S \subset N-i} \binom{|N-1|}{|S|}^{-1} (u(S \cup i) - u(S)),$$

which may be expressed alternatively as:

$$v_i = \sum_{S \subset N-i} (u(S \cup i) - u(S)) \frac{1}{|N|\binom{|N-1|}{|S|}}$$

$$v_i = \sum_{S \subset N-i} (u(S \cup i) - u(S)) * P(\text{subset } S \text{ chosen from all subsets})$$

$$v_i = E[\Delta_{p_i} Value(i)]$$

Therefore, Shapley Values fit directly into the high-level expected marginal utility framework described previously.

Very often, value is assigned to features in AI models using variable importance measures that arise during the construction of tree-based models such as random forests or gradient boosted trees. In essence, variable importance is a measure of decrease in generalization error after a feature is replaced with a random value via a permutation operation. An embodiment may use this by taking advantage of certain equivalences, namely: using generalization error as a utility function, sampling in the data's empirical measure and computing the average change in generalization error in that measure when the data are replaced by random values over all nodes and trees in the ensemble containing that feature.

In this instance, one particular embodiment uses variable importance to compute component expected marginal values. Variable importance algorithms used in tree-based models compute a variant of the following metric:

$$Imp(i) = \frac{1}{N_T} \sum_T \sum_{t \in T \text{ s.t. } v(s_t)=i} p(t) \Delta u(s_t, t)$$

Where $N_T$ is the total number of trees in the ensemble and $v(s_t)$ is the variable used to split in tree t for node $s_t$, p(t) is the proportion of samples reaching tree t and $\Delta u(s_t, t)$ is the decrease in generalization error at node $s_t$. The statistic can then be viewed as an expectation taken over a series of conditional expectations with respect to each tree in the forest.

$$Imp(i) = E_T[E_t[\Delta u(s_t,t)]|s_t=i,t=T]|s_t=i] = E_T[\Delta u(i,t)]$$

Which is essentially an expected change in utility for $feature_i$ over all trees in the ensemble.

In the above examples, viewing feature valuation as a computation of expected marginal or differential utility is extremely valuable and generalizable. In essence, value of a feature is equal to its marginal contribution to the total "pot of value".

Example 3—Rule-Based Attribution of Component Values

In some embodiments, an estimated value function may be dependent on one or more other system components or even external business rules. For example, there may be a rule that components obtained from a particular supplier always map to the same utilities regardless of the component. Another example may be where certain types of nodes in the data analytics system's computation graph (let's call them AI assets) always map to constant utilities. A more complicated rule-based attribution method may state that components having usage metrics that do not vary have value equal to a weighted average of observed utility. Still, another rule-based attribution method assigns non-varying components the amount of utility not explained by the other components in the system as determined by a kernel regression model as previously described. Various embodiments are described below.

A. Constant Component Attribution Map (Business Rules)

Consider the example of an AI asset such as a vector assembler, count vectorizer, one hot encoder, or any other easily-accessible and freely available ML transformer. In this case, suppose a buyer has decided that "free" transformers are always worth 1,000 utils and wants to understand how the addition of three additional components valuations relate to the use of one instance of a one hot encoder in its data analytics system.

Example Data:

| | Component Usage | | | | |
|---|---|---|---|---|---|
| Unit | Component 1 | Component 2 | Component 3 | One Hot Encoder | Value |
| Unit 1 | 0.25 | 0.25 | 0.75 | 0.3 | 100,000 |
| Unit 2 | 0.22 | 0.29 | 0.7 | 0.7 | 110,000 |
| Unit 3 | 0.15 | 0.34 | 0.88 | 1.0 | 130,000 |
| ... | ... | ... | ... | ... | ... |

In this case, we execute Algorithm 1 above with a polynomial kernel regression estimator to evaluate the three unknown component valuations to get:

| Item | Component 1 | Component 2 | Component 3 | One Hot Encoder |
|---|---|---|---|---|
| Value | 4,100 | 3,000 | 800 | ? |

Applying a rule-based attribution to the One Hot Encoder, the final valuations are:

| Item | Component 1 | Component 2 | Component 3 | One Hot Encoder |
|---|---|---|---|---|
| Value | 4,100 | 3,000 | 800 | 1000 |

Which tells the buyer that in their utility space, components 1 and 2 provide roughly 4× and 3× the value of a one hot encoder while component 3 provides 20% less value.

B. Component with Non-Varying Metrics

Suppose there exists a Component in our system for which metrics do not vary. A concrete example of this would be a integer programming solver, which always runs on a proportion of traffic. In many cases that proportion of traffic may be 100%. If the Component is used all the time, we can argue mathematically and game theoretically that the sample mean utility approach is justified.

A core idea in coalitional games is that the value of the empty coalition is 0, $u(\emptyset)=0$. In the valuation framework, components are assigned value by estimating $E[\Delta_{p_i}\text{Value}(i)]$ for component i. By writing out the Shapley value for non-varying component i:

$$v_i = \frac{1}{|N|} \sum_{S \subset N-i} \binom{|N-1|}{|S|}^{-1} (u(S \cup i) - u(S))$$

Define $u(T)=E[v(\{T \in \text{Data}\})]$ for any $T \subset N$ where $v(\{T \in \text{Data}\})$ is the observed utility of $T \subset N$ in the data and $E[v(\{T \in \text{Data}\})]$ can be estimated by the sample mean over the instances in the Data where $T \subset N$ occurs. Then, because it is never the case in our data that component i is not present, if $S \subset N-i$:

$$u(S)=E[v(\{S \in \text{Data}\})]=E[v(\emptyset)]=0$$

Therefore:

$$v_i = \frac{1}{|N|} \sum_{S \subset N-i} \binom{|N-1|}{|S|}^{-1} (u(S \cup i) - u(S))$$

Which is approximately:

$$v_i \cdot \Sigma_{S' \subset N} u(S')P(S')$$

Where S' are all possible subsets of N and P(S') is the probability of observing S' in the data.

Consequently, the expected marginal utility of the always-present component is a sample average over all average utilities observed.

A more flexible approach for handling always-present component valuation is to use a valuation algorithm like Algorithm 1 for all varying components and set the expected marginal utilities of non-varying component to the constant term provided by a kernel regression estimator used in step 2 of Algorithm 1 for estimating $E[\text{Value}|\vec{p}]$.

In this instance, the constant represents the amount of value created in the system that cannot be explained by the varying components. Or put another way, subtracting the other variable effects in the model from the predicted utility results in a constant, unexplained bias term. Therefore, always-on component(s) (as well any nodes in the data analytics system not attributed to components) contribute to this bias.

Mathematically, for any prediction that follows the rule:

$$\hat{y}(\vec{x})=F(\vec{x})+\text{Constant}$$

where $\vec{x}$ represents the data and F is a predictive function that varies with the data, the unexplained portion of the prediction that does not depend on the data is:

$$\text{Constant}=\hat{y}(\vec{x})-F(\vec{x})=\text{unexplained}$$

For linear models trained on centered data, this is equivalent to the sample average utility approach. However, note that this equivalence does not hold for general functions since the intercept for a multidimensional second degree polynomial with positive weights fit to positive data is equal to the minimum total expected utility.

To provide a concrete example, suppose a buyer is operating under the same conditions as in the ML Estimation polynomial kernel example. However, the buyer also purchases an expensive integer optimizer license and uses that component to generate every system output.

Example Data:

| | Component Usage | | | | |
|---|---|---|---|---|---|
| Unit | Component 1 | Component 2 | Component 3 | Optimizer | Utility |
| Unit 1 | 0.25 | 0.25 | 0.75 | 1.0 | 100,000 |
| Unit 2 | 0.22 | 0.29 | 0.7 | 1.0 | 110,000 |
| Unit 3 | 0.15 | 0.34 | 0.88 | 1.0 | 130,000 |
| ... | ... | ... | ... | ... | ... |

Fitting a regularized polynomial regression of degree 2 to the data produces the same weights and applying the intercept rule to the always-present component:

$w_1=20,000$, $w_{11}=10,000$ $w_{12}=200,000$
$w_2=10,000$ $w_{12}=200,000$
$w_3=4,000$
$w_0=80,000$
All other $w_{ij}=0$.
Therefore:

| Item | Component 1 | Component 2 | Component 3 | Optimizer |
|---|---|---|---|---|
| Value | 4,100 | 3,000 | 800 | 80,000 |

As a result, the buyer is now aware that the integer optimization license is by far the most valuable component in the system.

As mentioned above, one benefit to the generalized formulation as an application of the expectation operator is that the law of total expectation may be exploited for the purpose of parallelizing computation and recomposing and aggregating intermediate values to get more efficient, representative and accurate estimates. If the data are at the same level of granularity either naturally or after a series of processing transforms, then the expectation operator is a mechanism for combining attributed value across disjoint subsets of components.

The key mathematical property used in these examples is:

$$E[\Delta_{p_i}\text{Value}(i)] = E[E[\Delta_{p_i}\text{Value}(i)|M_k]]$$

Where $M_k$ refers to dimension k within either the system or data or both. As a result, the data (or system) can be broken into k dimensions and compute $E[\Delta_{p_i}\text{Value}(i)]$ restricted to dimension $M_k$ and then recombine those estimates across all dimensions. This allows for parallel computation and reaggregation at varying levels of granularity with the expectation operator acting as a composition mechanism.

The outer $E[\ ]$ operator can be estimated via any reasonable approximation depending on the utility function estimated or the data itself such as but not limited to: simple average, weighted arithmetic mean, geometric mean or harmonic mean.

In one example, the following data represents usage across various sets of components, referred to as dimensions, and components.

| | | | | | | | |
|---|---|---|---|---|---|---|---|
| Usage by component by dimension | | | | | | | |
| Unit | dimension 1 | ... | Component 1 | Component 2 | Component 3 | ... | Value |
| Unit 1 | 1 | ... | 1.0 | 0.0 | 0.91 | ... | 100,000 |
| Unit 2 | 2 | ... | 0.77 | 1.0 | 0.41 | ... | 200,000 |
| Unit 3 | 1 | ... | 0.3 | 0.3 | 1.0 | ... | 150,000 |
| Unit 4 | 3 | ... | 0.0 | 1.0 | 0.9 | ... | 250,000 |

Columnar ellipses refer to extra dimensions or components as needed. Data with any schema can be massaged into the above format via a series of processing transformations.

For parallelization, the usage data is grouped at the dimension level(s) and expected marginal utilities of each component for each set of groups is estimated and then reaggregated with a suitable reaggregation strategy such that all comparisons, measures and estimates are expressed on the same scale. Examples of reaggregation across different granularities are given below.

Example 4—Value Composition to Package Levels

Several sellers may provide multiple packages consisting of many components. Because utility ultimately needs to be attributed at a lower level of granularity than the period total, a "group by" operation is performed on the data and aggregated over all components belonging to each package and each seller. More broadly, we can think of each seller as a union of sets of components (the packages). In this example, all usage metrics are aggregated at the same level granularity. This example also assumes that utility and measurements are normalized and/or amortized accordingly such that they are all on the same scale.

To illustrate the above scenario, the data may look like:

| | | | | |
|---|---|---|---|---|
| Usage by Component Seller | | | | |
| Unit | Seller 1 | Seller 2 | Seller 3 | Value |
| Unit 1 | [0.75, 0.2, 0.0] | 0.0 | [0.62, 0.91] | 100,000 |
| Unit 2 | [0.77, 0.1, 1.0] | 1.0 | [0.12, 0.41] | 200,000 |
| Unit 3 | [1.0, 1.0, 0.0] | 0.3 | [0.0, 1.0] | 150,000 |
| ... | ... | ... | ... | ... |

In a first embodiment, the component data is ignored and the data is aggregated at the component level through a suitable aggregation function. Using the max( ) operator to aggregate component usage for each set results in:

| | | | | |
|---|---|---|---|---|
| Aggregate Usage by Seller over Components | | | | |
| Unit | Seller 1 | Seller 2 | Seller 3 | Value |
| Unit 1 | 0.75 | 0.0 | 0.91 | 100,000 |
| Unit 2 | 0.77 | 1.0 | 0.41 | 200,000 |
| Unit 3 | 1.0 | 0.3 | 1.0 | 150,000 |
| ... | ... | ... | ... | ... |

The expected marginal utility of each set may then be estimated using any of the methods described above, although potentially useful component information is lost during the aggregation which may allow for more accurate expected marginal utility estimates.

In a second embodiment, individual component usage metrics are considered by taking the product of component metrics with the corresponding sellers:

| Component usage | | | | | | |
|---|---|---|---|---|---|---|
| Unit | Seller 1 - c1 | Seller 1 - c2 | Seller 1 - c3 | Seller 2 | Seller 3 - c1 | Seller 3 - c2 | Value |
| Unit 1 | 0.75 | 0.2 | 0.0 | 0.0 | 0.62 | 0.91 | 100,000 |
| Unit 2 | 0.77 | 0.1 | 1.0 | 1.0 | 0.12 | 0.41 | 200,000 |
| Unit 3 | 1.0 | 1.0 | 0.0 | 0.3 | 0.0 | 1.0 | 150,000 |
| ... | ... | ... | ... | ... | ... | ... | ... |

The component values are then estimated individually by any of the methods described above.

| Component value | | | | | |
|---|---|---|---|---|---|
| | Seller 1 - c1 | Seller 1 - c2 | Seller 1 - c3 | Seller 2 | Seller 3 - c1 | Seller 3 - c2 |
| Value | 75,000 | 20,000 | 10,000 | 100,000 | 77,000 | 200,000 |

In this case, the component values can be rolled up to set values by applying the expectation operator over all the components per set as an aggregation function. For example, one approach to roll up component values to seller values is to take the average component value per set where each component value is weighted identically, resulting in:

| Seller value | | | |
|---|---|---|---|
| | Seller 1 | Seller 2 | Seller 3 |
| Value | 35,000 | 100,000 | 138,500 |

In some cases, the above aggregation operation can be parallelized per seller.

| Component usage for Seller 1 | | | | |
|---|---|---|---|---|
| Unit | Seller 1 - c1 | Seller 1 - c2 | Seller 1 - c3 | Value |
| Unit 1 | 0.75 | 0.2 | 0.0 | 100,000 |
| Unit 2 | 0.77 | 0.1 | 1.0 | 200,000 |
| Unit 3 | 1.0 | 1.0 | 0.0 | 150,000 |
| ... | ... | ... | ... | ... |

| Component usage for Seller 2 | | |
|---|---|---|
| Unit | Seller 2 | Value |
| Unit 1 | 0.0 | 100,000 |
| Unit 2 | 1.0 | 200,000 |
| Unit 3 | 0.3 | 150,000 |
| ... | ... | ... |

| Component usage for Seller 3 | | |
|---|---|---|
| Unit | Seller 3 - c1 | Seller 3 - c2 | Value |
| Unit 1 | 0.62 | 0.91 | 100,000 |
| Unit 2 | 0.12 | 0.41 | 200,000 |
| Unit 3 | 0.0 | 1.0 | 150,000 |
| ... | ... | ... | ... |

Valuation algorithms are then applied in parallel to produce a final component valuation table:

| Component value | | | | | |
|---|---|---|---|---|---|
| | Seller 1 - c1 | Seller 1 - c2 | Seller 1 - c3 | Seller 2 | Seller 3 - c1 | Seller 3 - c2 |
| Value | 75,000 | 20,000 | 10,000 | 100,000 | 77,000 | 200,000 |

Final seller values (equivalent to set values) are then computed as above via application of the law of total expectation.

This distributive method works well where sellers are independently responsible for utility (e.g. where value is only given for usage) but fails when there is dependence across sellers.

Example 5—Value Composition Across Dimensions

In some embodiments, a buyer may purchase several components and use those components differently in several disjoint execution environments where utility is defined consistently, but budget is allocated differently through separate insertion orders (I.O.s). Each environment reports back data at different time-based granularities.

For this example, the dimensions correspond to separate execution environments: dimension 1 provides daily measurement and utility data while dimensions 2 and 3 provide weekly data.

Several methods for amortizing utility to value units and reaggregating across different dimensions are provided.

Example Data:

| Usage by component by dimension at data unit granularity | | | | | | |
|---|---|---|---|---|---|---|
| Unit | dimension | Component 1 | Component 2 | Component 3 | Impressions | Cumulative Impressions |
| Unit 1 | 1 | 1.0 | 0.0 | 0.91 | 10,000 | 10,000 |
| Unit 2 | 2 | 0.77 | 1.0 | 0.41 | 200,000 | 200,000 |
| Unit 3 | 1 | 0.3 | 0.3 | 1.0 | 20,000 | 110,000 |
| Unit 4 | 3 | 0.0 | 1.0 | 0.9 | 50,000 | 250,000 |
| ... | ... | ... | ... | ... | ... | ... |

Assume utility is a function of cumulative impressions (cimp) and unit impressions (imp) defined by:

$$V(cimp, imp) = \begin{cases} imp, & \text{if } cimp > 100,000 \\ 0, & o.w. \end{cases} \quad 5$$

Such a function represents an allocation scheme where there is no charge for the first 100,000 impressions received.

Applying the utility function results in:

| Unit | dimension | Component 1 | Component 2 | Component 3 | Impressions | Cumulative Impressions | Utility |
|---|---|---|---|---|---|---|---|
| | | | Usage by component by dimension at data unit granularity | | | | |
| Unit 1 | 1 | 1.0 | 0.0 | 0.91 | 10,000 | 10,000 | 0 |
| Unit 2 | 2 | 0.77 | 1.0 | 0.41 | 200,000 | 450,000 | 200,000 |
| Unit 3 | 1 | 0.3 | 0.3 | 1.0 | 20,000 | 110,000 | 20,000 |
| Unit 4 | 3 | 0.0 | 1.0 | 0.9 | 50,000 | 250,000 | 50,000 |
| ... | ... | ... | ... | ... | ... | ... | ... |

Utility being a function of a cumulative measurement complicates reaggregation of data across different scales.

In this first approach, dimension 1 measurements are reaggregated to weekly statistics by averaging component usages and summing utilities to get:

| Unit | dimension | Component 1 | Component 2 | Component 3 | Impressions | Cumulative Impressions | Utility |
|---|---|---|---|---|---|---|---|
| | | | Usage by component by dimension at weekly granularity | | | | |
| Unit 2 | 2 | 0.77 | 1.0 | 0.41 | 200,000 | 450,000 | 200,000 |
| Unit 3 | 1 | 0.37 | 0.44 | 0.8 | 110,000 | 110,000 | 20,000 |
| Unit 4 | 3 | 0.0 | 1.0 | 0.9 | 50,000 | 250,000 | 50,000 |
| ... | ... | ... | ... | ... | ... | ... | ... |

In another embodiment, a total utility is computed over the entire period for dimension 1 data and then amortized proportionally to unit according to the number of impressions generated. dimensions 2 and 3 can be rescaled such that their utility values are on the same daily scale after dividing by 7.

If total dimension 1 utility for the entire period is 400,000 and total impressions generated by dimension 1 are 500,000. Then, each impression is worth 0.8 utility points. After amortization:

| Unit | dimension | Component 1 | Component 2 | Component 3 | Impressions | Cumulative Impressions | Transformed Utility |
|---|---|---|---|---|---|---|---|
| | | | Usage by component by dimension with amortization | | | | |
| Unit 1 | 1 | 1.0 | 0.0 | 0.91 | 10,000 | 10,000 | 8,000 |
| Unit 2 | 2 | 0.77 | 1.0 | 0.41 | 200,000 | 450,000 | 28,571 |
| Unit 3 | 1 | 0.3 | 0.3 | 1.0 | 20,000 | 110,000 | 16,000 |
| Unit 4 | 3 | 0.0 | 1.0 | 0.9 | 50,000 | 250,000 | 7,143 |
| ... | ... | ... | ... | ... | ... | ... | ... |

This approach requires more customization based on the data and utility function but preserves a significant amount of information at a high level of granularity for dimension 1.

In a general case, a group of specific transforms are defined taking utility, cumulative utility and data attributes and mapping each row to utility per data unit. In this case, amortized daily utility per impression is used for dimension 1 and rescaled by a factor of (1/7) for dimensions 2 and 3. This general amortization transform strategy is also useful in the multidimensional parallelized case.

After applying one or more separate estimation algorithms to the data in each dimension:

| dimension 1 Component Values | | | |
|---|---|---|---|
| | Component 1 | Component 2 | Component 3 |
| Value | 8,000 | 21,000 | 4,500 |

| dimension 2 Component Values | | | |
|---|---|---|---|
| | Component 1 | Component 2 | Component 3 |
| Value | 10,000 | 25,000 | 3,500 |

| dimension 3 Component Values | | | |
|---|---|---|---|
| | Component 1 | Component 2 | Component 3 |
| Value | 5,000 | 18,000 | 5,000 |

These estimates are then combined across all dimensions according to a pre-specified outer expectation estimation policy. In one embodiment, the policy can be expressed as:

$$E[Value(i)] = \frac{1}{\sum_{k=1}^{3} utility(k)} \sum_{k=1}^{3} E[Value(i) \mid k] * utility(k)$$

Where utility(k) is the sum of all utility occurring in dimension k. Essentially, each component utility is weighted on each dimension by its share of total utility. Note that another way to combine component utilities over separate dimensions is to weight by share of usage measure, which is equivalent to evaluating the outer expectation in the usage measure.

Applying the above equation, the estimates for expected marginal utility per component are:

| Component Values | | | |
|---|---|---|---|
| | Component 1 | Component 2 | Component 3 |
| Value | 7,930 | 21,700 | 4,255 |

Example 6—Multi-Objective Utility Function

When the Buyer has a multi-objective utility function, it may be provided explicitly by the Buyer, inferred from context, or chosen some other way.

In certain instances, each data unit provided has values present for all value metrics on which the utility function depends, in which case the utility function is applied to each data unit and proceed as in the single utility case described above. However, not all value metrics will necessarily be present for all data units at all granularities. As a result, several methods are used to address this shortcoming.

Suppose a buyer purchases AI assets from several sources and uses those assets across three execution environments (dimensions 1-3). The buyer has 3 objectives (Values 1-3). dimension 1 issues performance reports at a daily level while dimensions 2 and 3 issue only end of month reports.

Example Data:

| Usage by component by dimension with varying objectives | | | | | | | |
|---|---|---|---|---|---|---|---|
| Unit | dimension | Component 1 | Component 2 | Component 3 | Value 1 | Value 2 | Value 3 |
| Unit 1 | 1 | 0.79 | 0.8 | 0.41 | 200 | N/A | N/A |
| Unit 2 | 2 | 0.77 | 1.0 | 0.41 | 210 | 5 | 2 |
| Unit 3 | 1 | 0.37 | 0.44 | 0.8 | 110 | N/A | N/A |
| Unit 4 | 3 | 0.0 | 1.0 | 0.9 | 50 | 25 | 5 |
| ... | ... | ... | ... | ... | ... | ... | ... |

Note that only Value 1 is present in data reported for dimension 1, which may be the case for a value measure like impressions which is available at many granularities (e.g., daily) while other more complex measures like unique diagnosed visitors may be only available at fewer granularities (e.g., monthly). Moreover, suppose that the utility function is given by:

$$T(V_1, V_2, V_3) = V_1 + V_2 + V_3^2$$

One approach removes all data units with missing values, and computes utility (T(V)) as in the one dimensional case:

| Usage by component by dimension with multiobjective utility | | | | | | | | |
|---|---|---|---|---|---|---|---|---|
| Unit | dimension | Component 1 | Component 2 | Component 3 | V1 | V2 | V3 | T(V) |
| Unit 2 | 2 | 0.77 | 1.0 | 0.41 | 210 | 5 | 2 | 219 |
| Unit 4 | 3 | 0.0 | 1.0 | 0.9 | 50 | 25 | 5 | 100 |

Unfortunately, information about U1 in dimension 1 is lost and only two observations remain for which utility can be computed.

Another option is to impute all N/A values with 0 resulting in:

| Usage by component by dimension with multiobjective utility | | | | | | | | |
|---|---|---|---|---|---|---|---|---|
| Unit | dimension | Component 1 | Component 2 | Component 3 | Value 1 | Value 2 | Value 3 | T(V) |
| Unit 1 | 1 | 0.79 | 0.8 | 0.41 | 200 | 0 | 0 | 200 |
| Unit 2 | 2 | 0.77 | 1.0 | 0.41 | 210 | 5 | 2 | 219 |
| Unit 3 | 1 | 0.37 | 0.44 | 0.8 | 110 | 0 | 0 | 110 |
| Unit 4 | 3 | 0.0 | 1.0 | 0.9 | 50 | 25 | 5 | 100 |
| ... | ... | ... | ... | ... | ... | ... | ... | ... |

Given data in this format, the algorithms outlined above are applied in parallel to this data in order to estimate expected marginal utility per component per unit and then aggregated using the law of total expectation. As described above, before proceeding with learning a value function, either Unit 1 data can be reaggregated and T(U) values summed such that all units are compared on a monthly level, or the total utility values, T(U) for Units 2 and 4 are rescaled by transforming those monthly values to a daily value scale.

After assigning value to components through various valuation algorithms, cost to a Buyer and amounts to be paid to Sellers may still need to be determined. Moreover, given a particular payment mechanism, a Buyer also faces decision problems related to quantity of Components used, rate of use, as well as possible adjustment of Packages and/or renegotiation of the economics of Seller relationships.

Contracts between a Buyer and Sellers may have arbitrary complexity, including minimums, prepayments, etc. Value allocation affect payments in two ways:

In the current period, if any payments are based on value.
In future periods
  by allowing the Buyer to optimize how it uses Components/Packages as well as provide it with information useful in renegotiating the economic relationship with Sellers.
  by allowing Sellers to renegotiate the economic relationship with the Buyer.

Some embodiments may not make attributed value available to Buyers and/or Sellers or may do some in some aggregated/summarized manner only.

The following examples illustrate how the approach addresses the above objectives and by extension how an aggregator, such as a component marketplace, can offer payment allocation and usage optimization services to participating buyers and sellers.

As described, valuing components according to their expected marginal utilities provides a fair value allocation mechanism as well as a benchmark for buyers to determine whether they are getting a good deal and what they can do to get more value.

All allocation valuations start with estimating value per package. All individual component values are computed in the expected marginal utility framework described above and rolled up into packages as outlined previously in the valuing sets of components given member component utilities section. The core mechanism for this is recursively applying the law of total expectation.

The advantage of valuing components according to the expected marginal utility they generate is that in a cooperative setting, an allocation proportional to those values is an equilibrium allocation. The assumption that the environment buyers and sellers operate in is cooperative is enforced by the notion that a seller will always gain more value or utility by cooperating in the value allocation process than not, a property referred to as superadditivity. Given superadditivity, the share-of-value allocation described is fair. Mathematically:

$$\text{Value} = E[\Delta \text{Value}] = \Sigma_{i=1}^{n} E[\Delta \text{Value} | \text{component } i] P(\text{component } i)$$

where the Expectation is equivalent to an integral operator and P(component i) is any proportional measure derived from component i's usage and the data relative to other components in the system, referred to as a payment efficient.

In certain embodiments of seller collaboration, some contracts between buyers and sellers may include sharing from a financial pool based on allocated value, often in addition to some fixed fees and/or minimum period payments. The pool is typically variable based on some system and/or business metrics, e.g., $2 CPM calculated on ad impressions, 5% of revenue, etc.

The examples below assume that component values (expected marginal utilities) have been rolled up into value per package unless otherwise specified.

Example 7—RTB Payment Allocation

1. Current State Governed by Independent Allocation

An advertiser has purchased two audience segments from a DMP, at $0.50 and $0.25 CPM respectively, due on ad impressions, and one fixed price agreement for an identity service for $1,000 per month. Utility is measured as impressions. At the end of the month the usage and value metrics are:

| Unit | Segment 1 | Segment 2 | Identity | Impressions |
|---|---|---|---|---|
| Unit 1 | 0.25 | 0.5 | 0.15 | 1,000,000 |

Payments according to negotiated contracts are:
Segment 1 payment=$0.5*0.25*1,000,000/1000=$125.00
Segment 2 payment=$0.25*0.5*1,000,000/1000=$125.00
Identity payment=$1000.00

2. Fair Cooperative Allocation

In an extension of the previous example, assume that expected marginal utilities estimated via any procedure above are:

| | Segment 1 | Segment 2 | Identity |
|---|---|---|---|
| Value | 8,000 | 36,000 | 4,000 |

In this period, there are $12,000 for these three components (determined by whatever mechanism) and contracts require components, each in its own package, to be paid according to value created. Then, final payments would be allocated to the providers as:

|  | Segment 1 | Segment 2 | Identity |
|---|---|---|---|
| Value | $2,000 | $9,000 | $1,000 |

Processing for payment period t may discover value metrics associated with one or more prior periods—referred to herein as the late arrival problem. Various embodiments may use one or a combination of strategies for dealing with late arrivals, including but not limited to:

Ignoring the value metrics altogether.

Ignoring the value metrics from system activity older than some threshold or lookback window.

"Recovering" the usage metrics associated with the value metrics and including them in collected data, with the appropriate period identified.

As above but adding them to the current period.

If some sellers require payment for value created in period t from usage in previous periods and if these and potentially other sellers have economic arrangements requiring them to share payments out of a "pool" determined in some manner, such pools may include holdbacks, e.g., reserve allocations for late arrival payments. Without them, if the full pool amount is paid in period t, late arrivals in future periods would require payments that exceed the pool. Typically, there is a window when late arrives are accepted. Upon the expiration of this window, any leftover from the holdback is typically distributed to sellers in proportion to their dues.

When a buyer has a need that may be served by one or more components that are not part of existing packages, the buyer faces one or more of the following problems:

Understanding the similarities and differences between substitute choices and their relationship to existing components used by the buyer.

Establishing expectations about the marginal benefit of choices.

Negotiating economic arrangements with package sellers.

Certain embodiments of the described invention facilitate the adoption of new components by buyers using the aggregator role.

To help a buyer understand the similarities and differences between new component choices and existing components, an aggregator may provide information to the buyer via reports, APIs and/or a user interface.

To the extent available, the aggregator may share information about the (marginal) value of components in other systems, from the same or other buyers, appropriately summarized, e.g., as a distribution plot and/or via summary statistics. Incompatible measures of value may be scaled appropriately, e.g., turned to relative value measures. The set of reference/benchmark systems/buyers may be automatically filtered to better match the buyer and/or its system. Alternatively, the buyer may be provided with tools, such as a user interface, to perform this filtering. Some embodiments may use reference systems, e.g., ones using reference data/models/etc., extended with the component(s) in question.

Type specific information may include, for example:

For data components, information related to availability and/or overlap with existing components used by the buyer's system. For example, a DMP helping a buyer choose amongst several audience segments that represent a related concept may report actual or estimated metrics about the number of unique identities in each segment, the overlap between segments, the number of net new unique identities added as compared to any existing segments already in use and/or given an ordering of segments, the extent to which different segments agree or disagree across identities, etc. These may include a variety of set distance measures, e.g., Jaccard distance, computed pairwise or in various other groupings generated automatically or as chosen by the buyer. The DMP may use HLL sketches to efficiently compute unique counts and/or set operations (union/intersection/difference) on segment data. Embodiments may implement intersection using HLL sketches and the inclusion/exclusion principle and/or using MinHash sketches (as they allow the computation of a Jaccard coefficient), which can then be multiplied by the size of the union, obtained by merging HLL sketches.

For model components, information related to model performance on reference/benchmark data and/or data provided by the buyer. Shared information may include, as applicable, AUCs, error reports, performance curves, (n-way) cross-validation results, etc.

To the extent cost information is available, the aggregator may provide measures of how cost relates to value and/or component-specific metrics, e.g., value per unit cost, cost per unit of value, cost to achieve a certain level of performance, e.g., AUC>x, etc. Cost-related information may be presented for multiple package options, as available.

In some embodiments, the aggregator may facilitate transactions among buyers and sellers by providing one or more of the following:

Information related to component/package value and/or type-specific metrics to the sellers similar to how they were provided to the buyer, potentially including information about component/package value/performance on any buyer-provided data/system (with buyer permission, as necessary).

An attestation that the buyer already has access to substitute components. Other things being equal, additional substitute components should generate diminishing marginal value. A seller may be willing to provide a package at a lower cost if the buyer can prove it already is using substitute components. The attestation may be legal in nature or based on observed component usage, whether the components are managed via the aggregator or whether their usage is observed in some other way, e.g., by analysis of a data analytics system or via an attestation from a trusted third party such as another aggregator. If the economic arrangement between the buyer and seller for a package is based on buyer's use of other components, the aggregator may also provide services related to what happens if the situation changes, e.g., notification when the buyer no longer uses substitute components and/or automatic adjustment of economic terms when this happens.

Usage recommendations to the buyer.

Pricing and/or packaging recommendations to the seller.

In some cases in which accuracy and trust are critical, embodiments may use blockchain technology in order to provide immutability guarantees, change detection, auditability, etc. with regard to the transactions among the parties. Certain embodiments may use, smart contracts, e.g., Ethereum smart contracts, to implement capabilities such as the automatic adjustment of economic terms between a buyer and seller if the buyer stops using certain components from seller as described above. Further, the decentralized nature of blockchain-based ledgers allow for embodiments that operate in a decentralized manner, e.g., without a business entity acting as an aggregator/attributor, thus increasing the efficiency of the buyer/seller interactions by removing/reducing intermediary economics. Some or all of the capabilities attributed to the aggregator and/or attributor role become a combination of smart contract logic, logic running inside buyer and sellers and/or services operated by third parties such as industry organizations, e.g., the Internet Advertising Bureau in the domain of online advertising.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 4:
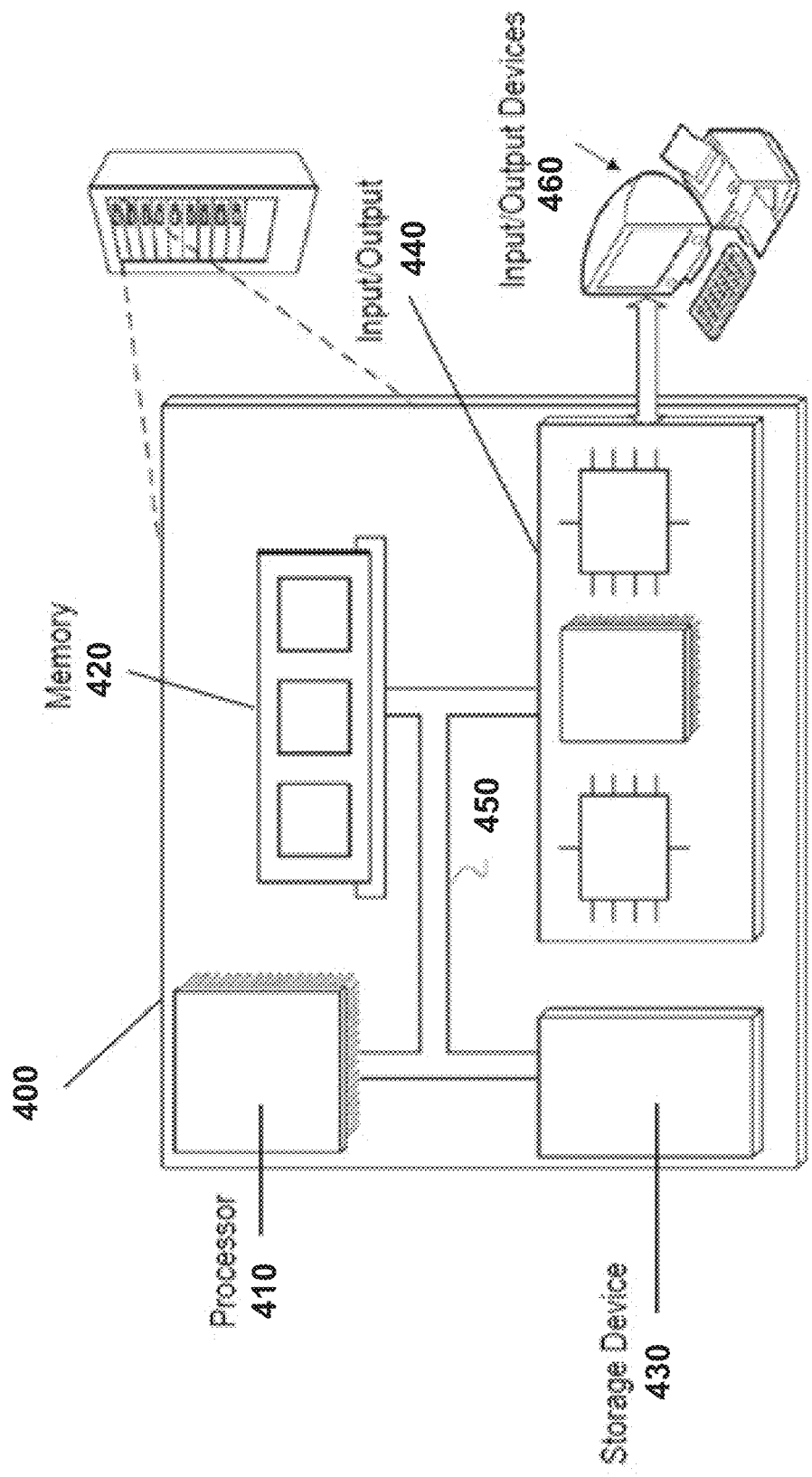
FIG. 4 depicts a block diagram of an example computer system.

FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A computer-implemented method for attributing value to components of a data analytics-driven system, the method comprising:
  representing the data analytics-driven system as a function that takes one or more inputs and produces one or more outputs, the data analytics-driven system having a plurality of components;
  forming a computational graph of the function, wherein each component of the data analytics-driven system is represented as a subgraph of the computational graph, wherein a particular subgraph of the computational graph comprises a node representing a machine learning or artificial intelligence (ML/AI) component in the data analytics-driven system, and
    wherein the data analytics-driven system takes inputs and produces outputs that are respectively different from the inputs and outputs of the function of which the computational graph is formed, and wherein the function is configured to facilitate determining respective values of one or more of the components of the data analytics-driven system rather than to replicate behavior of the data analytics-driven system;
  calculating a usage metric for each component of the data analytics-driven system by determining whether the output of the function of the data analytics-driven system is affected by the component;
  calculating a utility metric for each component of the data analytics-driven system; and
  based on the usage metric and the utility metric calculated for each component of the data analytics-driven system, allocating a respective value to one or more of the components of the data analytics-driven system, wherein the allocating comprises determining a value of the ML/AI component given its inclusion in the data analytics-driven system.

2. The method of claim 1, wherein calculating the usage metric for a first component of the data analytics-driven system represented by a first subgraph of the computational graph comprises:
  transforming the first subgraph such that each other subgraph connected to the first subgraph is a single node;
  calculating a usage value for each node in the transformed first subgraph; and
  calculating the usage metric based on the usage values.

3. The method of claim 1, wherein calculating the utility metric for a first component of the data analytics-driven system comprises:
  if a utility function exists for the component, using the utility function to calculate the utility metric for the first component; and
  if a utility function does not exist for the component, assigning a placeholder utility to the first component.

4. The method of claim 1, further comprising combining the usage metric and the utility metric calculated for each component of the data analytics-driven system to form combined metric data.

5. The method of claim 4, wherein combining the usage metric and the utility metric calculated for each component comprises associating a particular usage metric and a particular utility metric at a same level of granularity.

6. The method of claim 5, wherein allocating a respective value to a first component of the data analytics-driven system comprising a first subgraph of the computational graph comprises applying a node-specific value decomposition algorithm to the first subgraph.

7. The method of claim 1, wherein allocating a respective value to one or more of the components of the data analytics-driven system comprises:
providing the usage metric and the utility metric calculated for each component as input to a machine learning algorithm; and
receiving as output from the machine learning algorithm a value for each component according to an expected marginal utility of the component.

8. The method of claim 1, further comprising aggregating values calculated for the components of the data analytics-driven system at a package level.

9. The method of claim 1, wherein a particular subgraph of the computational graph comprises nodes representing data sources and/or machine learning processes.

10. The method of claim 1, wherein the computational graph comprises a directed acyclic graph.

11. A system for attributing value to components of a data analytics-driven system (DAS), the system comprising:
a processor; and
a memory storing computer-executable instructions that, when executed by the processor, program the processor to perform the operations of:
representing the DAS as a function that takes one or more inputs and produces one or more outputs, the DAS having a plurality of components;
forming a computational graph of the function, wherein each component of the DAS is represented as a subgraph of the computational graph, wherein a particular subgraph of the computational graph comprises a node representing a machine learning or artificial intelligence (ML/AI) component in the DAS,
wherein the data analytics-driven system takes inputs and produces outputs that are respectively different from the inputs and outputs of the function of which the computational graph is formed, and wherein the function is configured to facilitate determining respective values of one or more of the components of the data analytics-driven system rather than to replicate behavior of the data analytics-driven system;
calculating a usage metric for each component of the DAS by determining whether the output of the function of the DAS is affected by the component;
calculating a utility metric for each component of the DAS; and
based on the usage metric and the utility metric calculated for each component of the DAS, allocating a respective value to one or more of the components of the DAS, wherein the allocating comprises determining a value of the ML/AI component given its inclusion in the DAS.

12. The system of claim 11, wherein calculating the usage metric for a first component of the DAS represented by a first subgraph of the computational graph comprises:
transforming the first subgraph such that each other subgraph connected to the first subgraph is a single node;
calculating a usage value for each node in the transformed first subgraph; and
calculating the usage metric based on the usage values.

13. The system of claim 11, wherein calculating the utility metric for a first component of the DAS comprises:
if a utility function exists for the component, using the utility function to calculate the utility metric for the first component; and
if a utility function does not exist for the component, assigning a placeholder utility to the first component.

14. The system of claim 11, further comprising combining the usage metric and the utility metric calculated for each component of the DAS to form combined metric data.

15. The system of claim 14, wherein combining the usage metric and the utility metric calculated for each component comprises associating a particular usage metric and a particular utility metric at a same level of granularity.

16. The system of claim 15, wherein allocating a respective value to a first component of the DAS comprising a first subgraph of the computational graph comprises applying a node-specific value decomposition algorithm to the first subgraph.

17. The system of claim 11, wherein allocating a respective value to one or more of the components of the DAS comprises:
providing the usage metric and the utility metric calculated for each component as input to a machine learning algorithm; and
receiving as output from the machine learning algorithm a value for each component according to an expected marginal utility of the component.

18. The system of claim 11, further comprising aggregating values calculated for the components of the DAS at a package level.

19. The system of claim 11, wherein a particular subgraph of the computational graph comprises nodes representing data sources and/or machine learning processes.

20. The system of claim 11, wherein the computational graph comprises a directed acyclic graph.

* * * * *